US006960046B2

(12) United States Patent
Kang

(10) Patent No.: US 6,960,046 B2
(45) Date of Patent: *Nov. 1, 2005

(54) PERMEABLE AND ELASTIC PAVEMENT BLOCKS

(76) Inventor: Sung Soon Kang, #304 Hojeong Villa, 679 Ilwon-dong, Kangnam-gu, Seoul (KR) 135-230

( * ) Notice: Subject to any disclaimer, the term of this patent is extended or adjusted under 35 U.S.C. 154(b) by 100 days.

This patent is subject to a terminal disclaimer.

(21) Appl. No.: 10/804,309

(22) Filed: Mar. 19, 2004

(65) Prior Publication Data

US 2005/0175410 A1    Aug. 11, 2005

(30) Foreign Application Priority Data

Feb. 6, 2004  (KR) ................ 10-2004-0007858

(51) Int. Cl.[7] .................................................. E01C 5/22
(52) U.S. Cl. ............................ 404/44; 404/32; 404/34
(58) Field of Search ......................... 404/17, 18, 27–36, 404/44, 72, 82

(56) References Cited

U.S. PATENT DOCUMENTS

| | | | | |
|---|---|---|---|---|
| 4,069,182 A | * | 1/1978 | McDonald | 521/44.5 |
| 4,113,401 A | * | 9/1978 | McDonald | 404/75 |
| 4,915,539 A | * | 4/1990 | Yoshikane et al. | 404/31 |
| 5,367,007 A | * | 11/1994 | Richards | 524/59 |
| 5,494,741 A | * | 2/1996 | Fekete et al. | 428/331 |
| 5,957,619 A | * | 9/1999 | Kinoshita et al. | 404/31 |
| 6,079,900 A | * | 6/2000 | Kumagawa et al. | 404/82 |
| 6,702,514 B2 | * | 3/2004 | Kaneko et al. | 404/32 |

FOREIGN PATENT DOCUMENTS

JP           06313301 A  *  11/1994  ............. E01C 5/22

* cited by examiner

*Primary Examiner*—Thomas B. Will
*Assistant Examiner*—Alexandra K. Pechhold
(74) *Attorney, Agent, or Firm*—Madson & Metcalf

(57) ABSTRACT

Permeable and elastic pavement blocks comprising waste-polyurethane chips, which use a binder specially developed to secure the binding between an upper polyurethane-chip layer and a lower permeable-concrete layer as well as the binding among the waste-polyurethane chips, resulting in excellent strength and durability, and use recycled polyurethane chips to provide elasticity and permeability suitable for sports activities, walking, and outdoor exercises the like.

13 Claims, No Drawings

PERMEABLE AND ELASTIC PAVEMENT BLOCKS

FIELD OF THE INVENTION

The present invention relates to permeable and elastic pavement blocks comprising waste-polyurethane chips. These blocks use a binder specially developed to secure the binding between an upper polyurethane-chip layer and a lower permeable-concrete layer as well as the binding among the waste-polyurethane chips, resulting in excellent strength and durability, and use recycled waste-polyurethane chips to provide elasticity and permeability suitable for sports activities, walking, outdoor exercises and the like.

BACKGROUND OF THE INVENTION

As for conventional blocks for pavement, there are general pavement blocks prepared by mixing aggregates such as rubble, sand and cement in appropriate portions, casting the mixture into a mold, and curing; and rubber blocks prepared by mixing waste-tire chips and/or waste-rubber chips with adhesives and pigments, and molding in a predetermined block shape.

However, these conventional blocks for pavement were not permeable. Thus, in case of heavy rain, except for only some part of the rain permeating through crevices among blocks, most of the rain did not sink into the ground, but flowed through roadside drainage system to river, stream, waste-water treatment plant or public water area. Therefore, in case of a localized torrential downpour for a short period of time or a heavy rain for a long period of time during the rainy season, the drained rain and water may overflow the river and stream, causing very dangerous and unstable situation. Also, as the rain and water could not permeate into the conventional pavement blocks, it obstructed safe passage and caused a lot of inconvenience to pedestrians.

In order to overcome such disadvantages of the conventional pavement blocks, permeable and drainage pavement blocks have been developed, among which Korean Utility Model Registration No. 195525 registered on Jun. 29, 2000 entitled "permeable blocks" discloses blocks for pavement or driveway. In this utility model, in order to facilitate the permeation of rain or water, each of the blocks includes grooves on side and top surfaces thereof to perforate through the top surface and the bottom surface of the block.

Further, Korean Utility Model Registration No. 248505 registered on Sep. 17, 2001 entitled "pavement blocks with draining function" discloses drainage pavement blocks used for parking lots or sidewalks, each of which includes a central hollow space and overflows in the center of the top and side surfaces thereof, and each of which is filled with permeable concrete in the central hollow space and the overflows.

Meanwhile, in order to overcome disadvantages of conventional impermeable pavement blocks, to prevent earth and sand's washing away from a slope of a dike, and to secure underground water resources by inducing rain or water to the ground, Korean Patent No. 165047 patented on Sep. 15, 1998 discloses permeable pavement blocks, which have the permeability coefficient of $10 \times 10^{-4}$ cm/sec and the porosity of 5–10% and comprise 102 parts by weight of water, 410 parts by weight of cement, 100 parts by weight of sand, 1685 parts by weight of short particle aggregates (5–10 mm diameter), 1.8 parts by weight of a retardant, and 1.0 part by weight of resin.

In addition, Korean Utility Model Registration No. 289645 registered on Sep. 4, 2002 discloses "permeable concrete blocks with a waste-tire chip layer", comprising a lower permeable-concrete layer prepared by mixing aggregates having the size of 13 mm or less, cement, water and admixture products in predetermined ratios; and an upper waste-tire chip layer provided in the thickness of 10–20 mm by mixing 100 g of waste-tire chips of 13 mm or less, 7–21 g of a binder, and 1–5 g of an inorganic pigment.

The permeable concrete blocks as disclosed in the above utility model had bi-directional permeability allowing rain or water to penetrate into the ground and to evaporate into the earth's surface, so that trees and plants could be provided with life-giving water and flooding of the river could be prevented. Also, by using recycled waste tires which have been one of the environmental pollutants, the blocks did not only absorb impact on foot, but also contributed to the protection of environment and mobility of old and feeble people.

However, since the waste tire's smell of rubber lasted for a long time, the blocks using the waste tire could not provide a pleasant sense of smell. Further, since the urethane, epoxy and acrylic resin binders used to adhere the waste-tire chips were those available in the market, there have been demands for a binder which enhances the adhesive strength and maintains the strength and durability of the blocks for a long time.

Further, conventional pavement blocks using waste-tire chips or rubber had disadvantages in that, upon exposure to the high temperature heat of the sun rays during summer, the surface temperature of the blocks abruptly increases and the elastic waste-tire chip layer is separated from or comes off the lower supporting layer. Also, during the pavement construction, it was inconvenient to fill the space formed between neighboring permeable blocks with sand and the like.

Accordingly, the inventor of the present invention studied and researched into materials and binders for the permeable pavement blocks, and as a result, the inventor completed the present invention by using waste-polyurethane chips in place of waste-tire chips as a main component of the permeable elastic pavement blocks and developed a binder to secure the binding between an upper polyurethane-chip layer and a lower permeable-concrete layer as well as the binding among the waste-polyurethane chips.

SUMMARY OF THE INVENTION

The object of the present invention is to provide permeable and elastic pavement blocks, which use waste-polyurethane chips obtained from soles of shoes, parts of toys, parts of refrigerators, parts of vehicles, and decrepit recycled-polyurethane resilient pavement to solve the smelling problem of waste tires, nurse resources and prevent environmental pollution, and to provide comfort and shock absorption in walking as well.

Another object of the present invention is to provide permeable and elastic pavement blocks, which use a binder specially developed to secure the binding between an upper polyurethane-chip layer and a lower permeable-concrete layer as well as the binding among the waste-polyurethane chips, resulting in excellent strength and durability.

A further object of the present invention is to provide permeable and elastic pavement blocks, which comprise an upper polyurethane-chip layer and a lower permeable-concrete layer, to allow rain or water to seep into the ground, thus providing safer walking, jogging or driving conditions and comfortable vision, and also preventing flooding of the river due to heavy rain.

In order to achieve the above objects, the permeable and elastic pavement blocks according to the present invention comprise a permeable concrete layer comprising aggregates of the size in the range of 5–13 mm, cement, water and admixture products; a primer layer; and an elastic layer from the bottom to the top, wherein the permeable concrete layer has the compressive strength of 100 kg/cm$^2$ or more and the permeability coefficient of $1 \times 10^{-3}$ cm/sec or more; the primer layer comprises 10–20% by weight of PPG (polypropylene glycol), 5–10% by weight of TMP (trimethylol propane), 5–10% by weight of 1,3-BG (1,3-butylene glycol), 15–25% by weight of TDI (toluene diisocyanate), 49–64.9% by weight of a solvent (xylene or methylethylketone), and 0.1–1.0% by weight of an additive (defoaming agent); and the elastic layer is prepared by mixing waste-polyurethane chips and a binder in the weight ratio of 3:1 to 5:1, the waste-polyurethane chips having the size of 1 to 5 mm and the binder comprising 50–70% by weight of PPG, 5–10% by weight of PBG (polybutadiene glycol), 3–5% by weight of 1,3-BG, 20–30% by weight of MDI (methylene diisocyanate) and 2–5% by weight of TDI.

It is preferable that the upper elastic layer should be formed to be 1–2 mm larger than the lower permeable-concrete layer.

With the permeable and elastic pavement blocks according to the present invention, there is no separation of the upper elastic layer from the lower permeable-concrete layer and no separation from the lower layer due to expansion of the upper elastic layer, which have been observed for the conventional waste-tire blocks or rubber blocks upon exposure to the high-temperature environment of summer.

Further, the permeable and elastic pavement blocks according to the present invention can just be provided on any place, without filling between neighboring blocks with sand and the like.

The permeable and elastic pavement blocks according to the present invention are manufactured by the steps of pouring permeable concrete into a mold; curing preliminarily by the supply of heat and pressure to form the permeable concrete layer; coating the permeable concrete layer with the primer layer; spreading the elastic layer comprising waste-polyurethane chips; and then pressurizing and curing the elastic layer.

Since use of excessive pressure in pressurizing the elastic layer can clog up the pores and reduce the permeability of the blocks, it is preferable to use an appropriate pressure. Upon hardening, the block is removed from the mold for natural curing.

The waste-polyurethane chips used in the present invention are obtained by collecting waste-polyurethane scraps from soles of shoes, parts of toys, parts of refrigerators, parts of vehicles, decrepit polyurethane resilient pavement, etc. and separating the scraps according to their colors; removing impurities attached on the scraps; pulverizing the waste-polyurethane scraps in a predetermined size; adding 0.3–1.0 kg of stearic acid, 20–30 kg of heavy calcium carbonate, 0.1–2.0 kg of titanium dioxide as a decolorant and white pigment and 5 kg or less of a pigment, based on 100 kg of the pulverized waste-polyurethane scraps and mixing them by stirring; heating and extruding the mixture; and then condensing and cutting the extruded mixture into a predetermined size.

In the present invention, a photoluminescent pigment, which emits light at night (darkness) or in case of rain by using the energy that has been accumulated during the daytime, can be used as the pigment, and zinc sulfide compounds can be used for this purpose. In this case, the amount of the photoluminescent pigment used is 20–40% by weight of the scraps.

For instance, waste-polyurethane chips made by using the photoluminescent pigment can be prepared separately from the chips made by using a normal pigment in a predetermined ratio, and they can be mixed with the binder respectively to form permeable and elastic blocks, so that the blocks can be respectively distributed and arranged in their respective positions that have been designed previously.

If a flame retarding property is required in preparing the waste-polyurethane chips, a flame retardant in the range of 1–2% of the scraps by weight can be added to the mixture.

Further, depending on usages of the permeable and elastic pavement blocks of the present invention, a foaming agent can be used to adjust the hardness of the waste-polyurethane chips. For example, the waste-polyurethane chips made by using a relatively large amount of the foaming agent can be used in blocks for sidewalks and trails, while the relatively hard polyurethane chips made by using less amount of the foaming agent can be used in blocks for bicycle paths and tracks for in-line skating.

The size of the waste-polyurethane chips can vary according to their usage, e.g. in 1–2 mm, 2–3 mm, 3–4 mm, 1–5 mm, etc. Smaller ones can be used for bicycle paths and tracks for in-line skating, and larger ones for sidewalks and trails. The waste-polyurethane chips in the elastic layer can be replaced in part or entirely with new polyurethane chips. The new polyurethane chips are prepared by mixing 1 part by weight of liquid polyurethane with 0.5–1.2 parts by weight of heavy calcium carbonate, and 0.01 part by weight or less of a pigment or 0.1–0.4 parts by weight of a photoluminescent pigment by stirring; pouring the mixture in a mold and curing in a sheet form; and then cutting the polyurethane sheet and pulverizing into a predetermined size. The new polyurethane chips manufactured as such are very clear in color.

In addition, the binder used in the present invention is to secure the binding between the elastic layer and the permeable concrete layer and also among the waste-polyurethane chips in the elastic layer. Usually, compounds having molecular weight of 1,000–5,000 and having more than two hydroxy groups (—OH) or multi-functional isocyanate compounds (—NCO) are used as the binder.

For example, TDI and MDI may be used as the chip binders. However, the adhesive property and the coefficient of expansion of the binders are variable depending on their molar ratio. Therefore, the inventor of the present invention developed a binder suitable for achieving the objects of the invention and having the elasticity and the coefficient of expansion similar to those of the polyurethane chips to provide excellent adhesive property among the chips. This specially developed binder according to the present invention comprises 50–70% by weight of PPG, 5–10% by weight of PBG, 3–5% by weight of 1,3-BG, 20–30% by weight of MDI and 2–5% by weight of TDI, wherein PPG is to provide toughness and 1,3-BG is used as a chain extender to form a polymer having higher molecular weight than a simple compound produced by the reaction between PPG and MDI. The binder of the present invention, therefore, does not only have a high adhesiveness and coefficient of expansion, but also has tensile strength and pliability from a primary reaction with MDI and a secondary reaction with TDI.

It is preferable that the polyurethane chips and the binder are blended in the weight ratio of 3:1 to 5:1. This is because use of the binder less than 15% by weight results in poor adhesive property and use of more than 40% causes the pores to be clogged or the binder to be blown up during the curing step.

DETAILED DESCRIPTION OF THE PREFERRED EMBODIMENTS

The principal of the present invention will be described in more detail below with reference to the embodiments, but the scope of the invention is not limited within the embodiments.

1. Preparation of Waste-polyurethane Chips

As a preliminary step, waste-polyurethane scraps were collected from soles of shoes, parts of toys, parts of refrigerators and vehicles, decrepit polyurethane resilient pavement, etc., and separated according to their colors. From the separated waste-polyurethane scraps, impurities stuck thereto were removed by cutting.

Then, the waste-polyurethane scraps were pulverized in a crusher in the particle diameter of 3–30 mm, and transported to a mixer.

Based on 100 kg of the pulverized waste-polyurethane scraps, 0.5 kg of stearic acid, 25 kg of heavy calcium carbonate, 0.2 kg of titanium dioxide and 1.5 kg of a pigment were added and mixed by stirring.

Then, the mixture was transported through a conveyor to an extruder where the mixture was extruded in the form of a plate.

The extruded waste-polyurethane was passed to a second crusher and a cutter to be cut in the particle size of 1–5 mm, resulting in the production of waste-polyurethane chips.

In this embodiment, if the flame retarding property is required, a flame retardant in the range of 1–2% by weight of the scraps can be added to the mixture.

2. Preparation of Binder 30 kg of PPG and 5 kg of PBG were prepared as polyol compounds. Also, 13 kg of MDI and 2 kg of TDI as multi-functional isocyanate compounds and 2 kg of 1,3-BG as a chain extender were prepared.

The above compounds were mixed with an accelerator and reacted to produce a binder having the following physical properties:

| Physical property (unit) | Result |
| --- | --- |
| Blending ratio | 1-part liquid |
| Solid in mixture (%) | 97 ± 3 |
| Appearance | transparent light yellow |
| Viscosity (Cps/25° C.) | 2500 ± 500 |
| Specific gravity | 1.00 ± 0.10 |
| Working life (min) | 30 ± 10 |
| Time for curing (hr) | 12 ± 3 |
| Coefficient of expansion (%) | 100 ± 50 |
| Tensile strength (kg/cm$^2$) | 10 ± 5 |
| Tear strength (kg/cm) | 7 ± 3 |

3. Preparation of Permeable and Elastic Pavement Blocks

Embodiment 1

A concrete mixture was prepared by mixing aggregates of the size in the range of 5–13 mm, cement, water and admixture products, and this mixture was poured in each mold for blocks to form a permeable-concrete layer.

Then, a primer composition prepared by mixing 5 kg of PPG, 3 kg of TMP, 2 kg of 1,3-BG, 7 kg of TDI, 17 kg of xylene as a solvent and 0.3 kg of a defoaming agent was spread on the permeable concrete layer.

In order to form an elastic layer above the permeable concrete layer, 100 kg of the waste-polyurethane chips having the size of 3 to 5 mm and 30 kg of the binder were blended.

This mixture was poured onto the primer layer in the thickness of 10–20 mm to be 1–2 mm larger than the lower permeable-concrete layer, and compacted with a press heated to the temperature of about 80° C. Then, the pavement in the mold was hardened and upon hardening, the block was removed from the mold for natural curing.

The permeable and elastic pavement blocks obtained as such were arranged as previously designed for trails and sidewalks, and they had the strength and elasticity suitable for trails and sidewalks.

Embodiment 2

50 kg of the waste-polyurethane chips obtained from the above Embodiment 1 were used together with 50 kg of polyurethane chips prepared by using new polyurethane material to be blended with the binder.

The urethane chips using the new polyurethane material were prepared by mixing 50 kg of liquid polyurethane with 35 kg of heavy calcium carbonate and 0.5 kg of a pigment in a high-speed stirrer of more than 1,000 rpm, pouring and curing the mixture in a frame in the shape of a plate, and then pulverizing it into the size of 3–5 mm.

The other procedures were the same as in Embodiment 1, and as a result the permeable and elastic pavement blocks in much clear color were obtained.

Embodiment 3

As another embodiment to produce permeable and elastic pavement blocks suitable for walking, the waste-polyurethane chips having the size of 3 to 5 mm on average were prepared by using a normal pigment and the chips having the same size were separately prepared by using a photoluminescent pigment (zinc sulfide), each of which were blended with the binder in the ratio of 4:1.

The other procedures were the same as in Embodiment 1.

The permeable and elastic blocks produced by using the normal pigment were arranged as previously designed, and the blocks using the photoluminescent pigment were also arranged according to a predetermined design.

As described above, the permeable and elastic pavement blocks according to the present invention use waste-polyurethane chips obtained from soles of shoes, parts of toys, parts of refrigerators, parts of vehicles and decrepit recycled-polyurethane resilient pavement, so that the smelling and breaking apart problems encountered in using waste-tire chips are solved, and they serve to nurse resources and prevent environmental pollution, and also provide comfort and shock absorption in walking.

Further, according to the present invention, the permeable and elastic pavement blocks use a binder specially developed to secure the binding between the polyurethane chip layer and the permeable concrete layer as well as the binding among the waste-polyurethane chips, resulting in excellent strength and durability.

Furthermore, the permeable and elastic pavement blocks according to the present invention comprise an upper polyurethane-chip layer and a lower permeable-concrete layer, allowing rain or water to seep into the ground, thus providing safer walking, jogging or driving conditions and comfortable vision, and also preventing flooding of the river due to heavy rain.

It will be apparent to those skilled in the art that various modifications and variations can be made to the present invention without departing from the spirit and scope of the invention. The present invention covers the modifications and variations thereof provided they come within the scope of the appended claims and their equivalents.

What is claimed is:

1. Permeable and elastic pavement blocks comprising a permeable concrete layer consisting of aggregates of the size in the range of 5–13 mm, cement, water and admixture products; a primer layer; and an elastic layer from the bottom to the top, wherein the permeable concrete layer has the compressive strength of 100 kg/cm$^2$ or more and the permeability coefficient of $1 \times 10^{-3}$ cm/sec or more;

the primer layer comprises 10–20% by weight of PPG, 5–10% by weight of trimethylol propane, 5–10% by weight of 1,3-butylene glycol, 15–25% by weight of toluene diisocyanate, 49–64.9% by weight of a solvent, and 0.1–1.0% by weight of an additive; and the elastic layer comprises waste-polyurethane chips and a binder in the weight ratio of 3:1 to 5:1, the waste-polyurethane chips having the size of 1 to 5 mm and the binder comprising 50–70% by weight of polypropylene glycol, 5–10% by weight of polybutadiene glycol, 3–5% by weight of 1,3-butylene glycol, 20–30% by weight of methylene diisocyanate and 2–5% by weight of toluene diisocyanate.

2. Permeable and elastic pavement blocks as claimed in claim 1, wherein the waste-polyurethane chips are obtained by collecting waste-polyurethane scraps and separating the scraps according to their colors; removing impurities attached on the scraps; pulverizing the waste-polyurethane scraps in a predetermined size; adding 0.3–1.0 kg of stearic acid, 20–30 kg of heavy calcium carbonate, 0.1–2.0 kg of titanium dioxide and 5 kg or less of a pigment or 20–40 kg of a photoluminescent pigment, based on 100 kg of the pulverized waste-polyurethane scraps and mixing them by stirring; heating and extruding the mixture in the form of a plate; and then condensing and cutting the extruded mixture into the size of 1 to 5 mm.

3. Permeable and elastic pavement blocks as claimed in claim 2, wherein a flame retardant is added to the mixture in the range of 1–2% by weight of the scraps in preparing the waste-polyurethane chips.

4. Permeable and elastic pavement blocks as claimed in claim 2, wherein depending on usages of the elastic pavement blocks, a foaming agent is used to adjust the hardness of the waste-polyurethane chips.

5. Permeable and elastic pavement blocks as claimed in claim 3, wherein depending on usages of the elastic pavement blocks, a foaming agent is used to adjust the hardness of the waste-polyurethane chips.

6. Permeable and elastic pavement blocks as claimed in claim 1, wherein the waste-polyurethane chips can be replaced in part with new polyurethane chips.

7. Permeable and elastic pavement blocks as claimed in claim 2, wherein the waste-polyurethane chips can be replaced in part with new polyurethane chips.

8. Permeable and elastic pavement blocks as claimed in claim 7, wherein the new polyurethane chips are prepared by mixing 1 part by weight of liquid polyurethane with 0.5–1.2 parts by weight of heavy calcium carbonate, and 0.01 part by weight or less of a pigment or 0.1–0.4 parts by weight of a photoluminescent pigment; pouring the mixture in a mold and curing in a sheet form; and then pulverizing the polyurethane sheet in the size of 1–5 mm.

9. Permeable and elastic pavement blocks as claimed in claim 2, wherein the blocks produced by using the waste-polyurethane chips or the new polyurethane chips using the normal pigment are arranged as previously designed, and the blocks produced by using the waste-polyurethane chips or the new polyurethane chips using the photoluminescent pigment are also arranged according to a predetermined design.

10. Permeable and elastic pavement blocks as claimed in claim 8, wherein the blocks produced by using the waste-polyurethane chips or the new polyurethane chips using the normal pigment are arranged as previously designed, and the blocks produced by using the waste-polyurethane chips or the new polyurethane chips using the photoluminescent pigment are also arranged according to a predetermined design.

11. Permeable and elastic pavement blocks as claimed in claim 1, wherein the solvent is xylene or methylethylketone.

12. Permeable and elastic pavement blocks as claimed in claim 1, wherein the additive is a defoaming agent.

13. Permeable and elastic pavement blocks as claimed in claim 2, wherein the waste-polyurethane scraps are collected from soles of shoes, parts of toys, parts of refrigerators and vehicles, or decrepit polyurethane resilient pavement.

* * * * *